United States Patent [19]

Satou et al.

[11] Patent Number: 5,253,009
[45] Date of Patent: Oct. 12, 1993

[54] EXPOSURE CONTROL APPARATUS OF CAMERA HAVING AN AUTO-EXPOSURE BRACKET MODE

[75] Inventors: Osamu Satou; Isamu Hashimoto; Takao Nishida, all of Tokyo, Japan

[73] Assignee: Asahi Kogaku Kogyo Kabushiki Kaisha, Tokyo, Japan

[21] Appl. No.: 795,184

[22] Filed: Nov. 19, 1991

Related U.S. Application Data

[62] Division of Ser. No. 409,156, Sep. 19, 1989, Pat. No. 5,099,267.

[30] Foreign Application Priority Data

Sep. 19, 1988 [JP] Japan ................. 63-234394

[51] Int. Cl.⁵ ............... G03B 7/00; G03B 7/26; G03B 17/20; G03B 17/38
[52] U.S. Cl. .................. 354/412; 354/474; 354/484; 354/266
[58] Field of Search ............... 354/412, 441, 442, 484, 354/474, 266

[56] References Cited

U.S. PATENT DOCUMENTS

| | | | |
|---|---|---|---|
| 4,083,059 | 4/1978 | Tsunekawa et al. | 354/149.1 |
| 4,629,305 | 12/1986 | Sato et al. | 354/442 |
| 4,734,727 | 3/1988 | Takemae | 354/412 |
| 4,794,418 | 12/1988 | Kabayashi et al. | 354/435 |
| 4,812,870 | 3/1989 | Kawamura | 354/412 |
| 4,862,205 | 8/1989 | Kawamura | 354/412 |
| 4,914,466 | 4/1990 | Wakabayashi et al. | 354/412 |
| 4,918,481 | 4/1990 | Yosukawa et al. | 354/412 X |
| 4,974,012 | 11/1990 | Ohsawa | 354/474 |

FOREIGN PATENT DOCUMENTS

| | | |
|---|---|---|
| 3414795 | 10/1984 | Fed. Rep. of Germany. |
| 3505306 | 9/1985 | Fed. Rep. of Germany. |
| 54-26893 | 6/1979 | Japan. |
| 61-148437 | 7/1986 | Japan. |
| 63-37320 | 2/1988 | Japan. |
| 63-37321 | 2/1988 | Japan. |
| 63-37322 | 2/1988 | Japan. |
| 63-37323 | 2/1988 | Japan. |
| 63-37324 | 2/1988 | Japan. |
| 63-37325 | 2/1988 | Japan. |
| 63-37326 | 2/1988 | Japan. |
| 63-37327 | 2/1988 | Japan. |
| 63-37328 | 2/1988 | Japan. |
| 63-37329 | 2/1988 | Japan. |
| 63-37330 | 2/1988 | Japan. |
| 63-37331 | 2/1988 | Japan. |
| 63-37332 | 2/1988 | Japan. |
| 63-37333 | 2/1988 | Japan. |
| 63-37334 | 2/1988 | Japan. |
| 2-219666 | 12/1989 | United Kingdom. |

Primary Examiner—W. B. Perkey
Attorney, Agent, or Firm—Sandler Greenblum & Bernstein

[57] ABSTRACT

An exposure control apparatus of a camera includes a first switch which can select a plurality of drive modes including an auto-exposure bracket mode (AEB mode), a second switch which issues signals when operated, a third switch which can modify an exposure correcting value and a memory which stores a plurality of predetermined exposure correcting values. A drive mode selector successively selects the drive modes in response to signals from the second switch when the second switch is actuated during the operation of the first switch. A modifying device successively selects an exposure correcting value to be used to correct the exposure value among those stored in the memory in response to signals issued from the second switch when the latter is actuated during the operation of the third switch. A photographing controller is provided which takes a plurality of pictures at different exposure values in an exposure width correcting values selected by the modifying device when the AEB mode is selected. The controller also interrupts photographing when a release switch is turned OFF.

10 Claims, 13 Drawing Sheets

EXPOSURE CONTROL APPARATUS OF CAMERA HAVING AN AUTO-EXPOSURE BRACKET MODE

This application is a division of application Ser. No. 07/409,156, filed Sept. 19, 1989, now U.S. Pat. No. 5,099,267.

BACKGROUND OF THE INVENTION

1. Field of the Invention

The present invention relates to an apparatus for control of exposure of a camera having an automatic exposure bracket mode drive mode (AEB mode) in which a plurality of pictures are taken while changing the exposure value within a predetermined exposure range.

2. Description of Related Art

A single-lens reflex camera having a photometer (brightness measuring device) and a distance meter (object distance measuring device) incorporated therein is known.

In such a single-lens reflex camera, the distance meter detects a distance (object distance) of an object to be photographed to move a focusing lens in accordance with the object distance thus detected, so that the focusing can be effected. On the other hand, the photometer detects the brightness of the object to determine a shutter speed or a diaphragm value in order to control the exposure in accordance with the brightness thus detected.

Generally speaking, such a single-lens reflex camera has various functions so as to respond to photographers' various requirements. These are, for instance, a continuous photographing mode at which a photographer can successively take pictures while a shutter button is pushed down a; programmed mode at which a combination of a shutter speed and a diaphragm value is determined; and a exposure adjustment mode at which an exposure is adjusted, etc. In particular, a camera is also known having an additional function of an AEB mode at which a plurality of frames of a film can be continuously taken with different exposure varies within predetermined exposure range (width).

According to a feature of the present invention, an exposure control apparatus for a camera is provided. The exposure control apparatus includes a photometer for measuring the brightness of an object to be photographed, a photographing mode setting mechanism for setting a desired photographing mode and a drive mode selecting mechanism for selecting a drive mode of a plurality of drive modes. Further, the exposure control apparatus according to the present invention includes an exposure factor setting device for setting an exposure factor, a film sensitivity setting device for setting the sensitivity of a film and a photometer switch for actuating the photometer.

A release switch is provided for starting a releasing operation. The exposure control apparatus of the present invention further includes an exposure operating mechanism for arithmetically calculating exposure to obtain exposure control factors, based upon the brightness detected by the photometer, the film sensitivity set by the film sensitivity setting device, the exposure factor set by the exposure factor setting device and the drive mode selected by the drive mode selecting mechanism. A photographing control mechanism is provided for performing photographing in accordance with the mode set by the photographing mode setting mechanism and the exposure control factors obtained by the exposure operating device.

According to a significant feature of the present invention, the drive modes include an auto-exposure bracket mode (AEB mode), which can be selected by the drive mode selecting mechansim and the photographing control mechanism and is operative to stop photographing when the release switch is turned OFF during photographing in the AEB mode, photographing being commenced by the releasing operation of the release switch after photographing is stopped at a time when the release switch is turned OFF, so that when the release operation is commenced again by the release switch, photographing in the AEB mode is continued.

Additionally, the photographing control mechanism of the present invention includes a mechanism for associating a time interval between sequential photographing operations within the AEB mode with actuations of the release switch.

According to a further feature of the present invention, the exposure control apparatus operates such that when the release switch is turned OFF during photographing in the AEB mode, photographing being commenced by the releasing operation of this release switch, the photographing control mechanism interrupts the remaining photographing at the AEB mode after the photographing is stopped when the release switch is turned OFF. Further, when the photometer switch is turned OFF, the photographing control mechanism interrupts photographing at the AEB mode upon the lapse of a predetermined period of time after the stop of the operation of the photometer switch.

BRIEF DESCRIPTION OF THE DRAWINGS

The invention will be described below in detail with reference to the accompanying drawings, in which.

DESCRIPTION OF THE PREFERRED EMBODIMENTS

Figure 1:
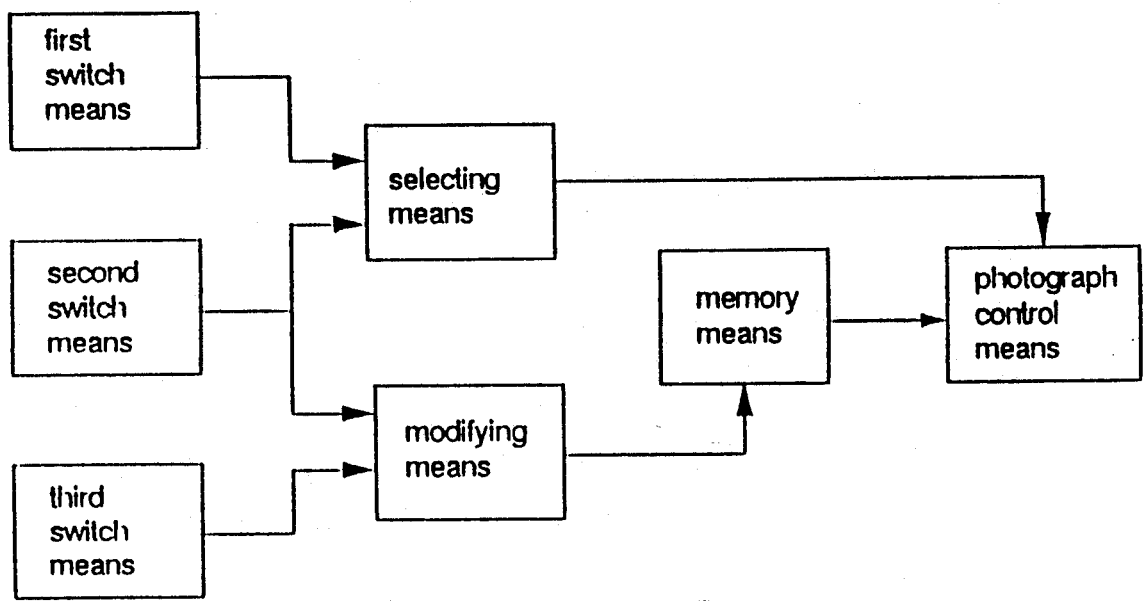
FIG. 1 is a block diagram showing a construction of an exposure control apparatus according to an aspect of the present invention.
Figure 3:
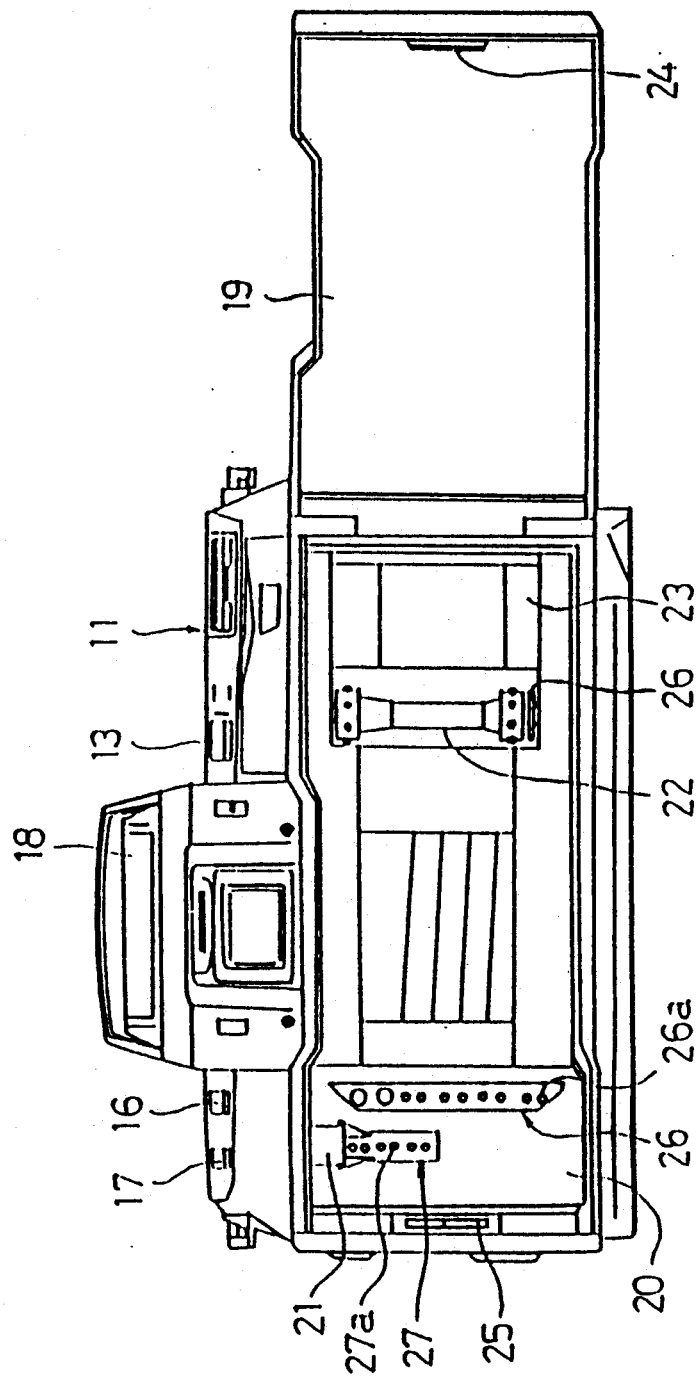
FIG. 3 is a back view of a single-lens reflex camera according to the present invention.
Figure 2:
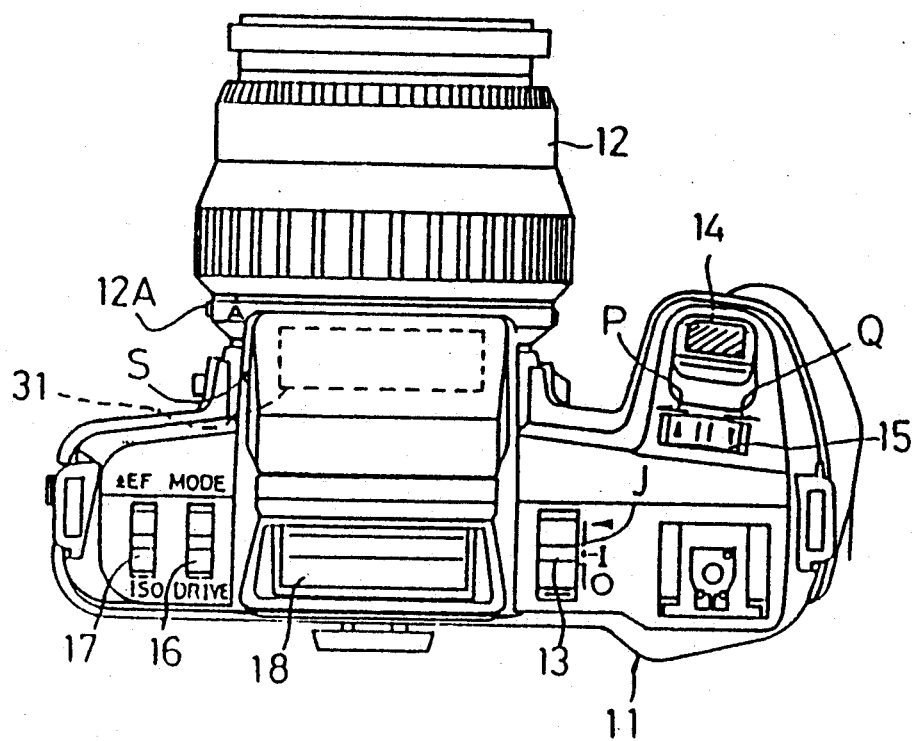
FIG. 2 is a back view of a single-lens reflex camera according to the present invention.
Figure 5:
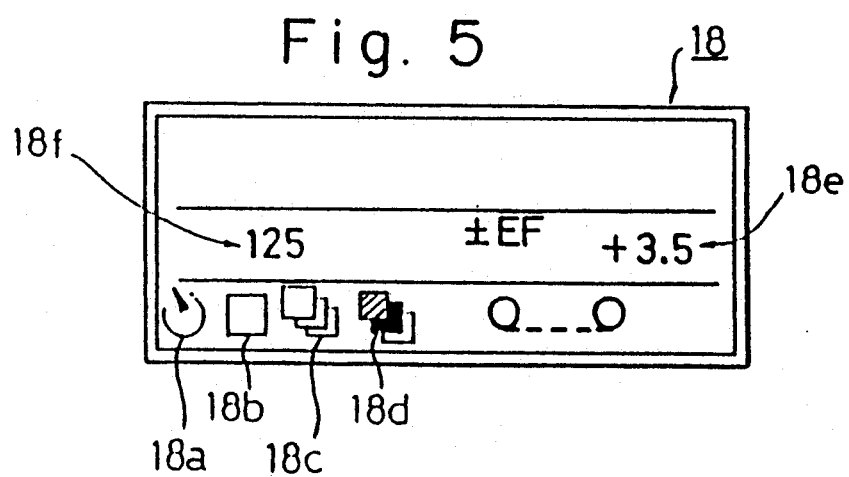
FIG. 5 is an explanatory view of a display panel.

In FIGS. 2 and 3 which show a single-lens reflex camera having an exposure control apparatus according to the present invention, a camera body 11 of the single lens reflex camera has a photographic lens 12 detachably mounted thereto.

On the upper surface of the body 11 are provided main switch 13, shutter switch 14, up-down switch (second switch means) 15, mode/drive lever 16, and ISO/exposure correcting lever 17. The main switch 13 is a slide switch which can selectively occupy three positions, that is, a lock position 0, an ON position I and a indicating position J. The indication position J corresponds to a mode at which when the photographic lens 12 is brought to a focused position, the completion of focusing is audibly indicated. The up-down switch 15 is manually movable by a finger of a photographer in the direction shown by an arrow P to occupy an UP position and in the direction shown by an arrow Q to occupy a DOWN position. When the finger is released from the up-down switch, it is returned to a neutral position shown in FIG. 2. Every time the up-down switch is moved in the P direction and Q direction, an increment and a decrement of the diaphragm correcting value are produced, respectively. Also, every time the up-down switch is pushed toward the UP side, the width (range) of the exposure correcting value can be changed. The up-down switch 15 is also adapted to successively switch the drive modes which will be described hereinafter.

The mode/drive lever 16 is pushed by a finger to move it toward the MODE side or the DRIVE side to change the modes. The mode/drive lever 16 is returned to a neutral position (shown in the drawings) when the finger is released therefrom. The ISO/exposure correcting lever 17 is pushed by a finger toward the ±EF side or the ISO side to change the modes. The ISO/exposure correcting lever is returned to a neutral position (shown in the illustrated position) when the finger is released therefrom.

Every time the up-down switch 15 is pushed toward the UP side or the DOWN side when the mode/drive lever 16 is moved toward the MODE side, the modes are successively switched between the programmed mode, a diaphragm priority mode and a shutter speed priority mode, etc..

Every time the up-down switch 15 is pushed toward the UP side when the mode/drive lever 16 is moved toward the DRIVE side, the modes are successively switched between a self-timer mode, a single mode at which a one frame photograph is exposed when the shutter switch is pushed, a continuous photographing mode at which a plurality of pictures (frames of films) can be continuously taken when the the shutter switch is pushed, and an AEB mode at which the exposure is automatically changed to take a plurality of pictures (three pictures in the illustrated embodiment), etc.

Figure 4:
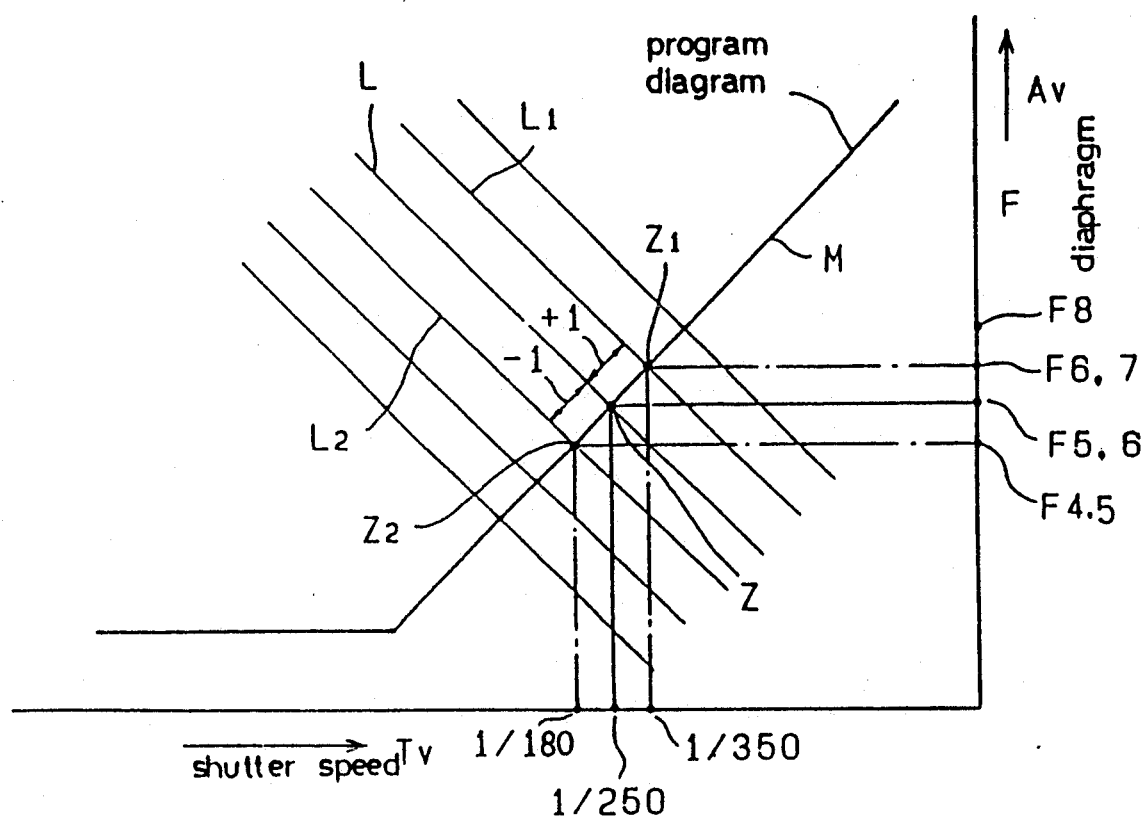
FIG. 4 is a program diagram showing how to obtain a shutter speed and a diaphragm value.

In the programmed mode at which the shutter speed and the diaphragm value are automatically determined, the picture can be taken at a specific shutter speed and a specific diaphragm value which are obtained by an intersecting point Z at which the program diagram M intersects the brightness L of the object, as shown in FIG. 4. Note that in FIG. 4, the shutter speed is 1/250 and the diaphragm value is F5.6.

Supposing that the width of the discontinuous exposure value Ev is ±1, and the brightness diagram of the object is L at the programmed mode at which the AEB mode is set, the first frame of film (first photograph) is taken at the intersecting point Z of the brightness line L and the program diagram M, i.e. at the shutter speed of 1/250 and the diaphragm value of F5.6. After that, the second frame of film (second photograph) is taken at the intersecting point Z1 of the shutter speed of 1/350 and the diaphragm value of F6.7 (under exposure). The third frame of film is taken at the intersecting point Z2 of the shutter speed of 1/180 and the diaphragm value of F4.5 (over-exposure).

A liquid crystal display panel 18 which will be referred to as a display panel hereinafter is provided on a pentagonal prism housing located at the central upper portion of the body 11 to indicate the state of the film, the set conditions of camera and various data necessary for photographing. The display panel 18 has a self-mode segment 18a for indicating the self-timer mode, a single mode segment 18b for indicating the single frame mode, continuous photographing mode segment 18c for indicating the continuous photographing mode, an AEB mode segment 18d for indicating the AEB mode, an $X_v$ segment 18e for indicating the exposure correcting value $X_v$, a shutter segment 18f for indicating the shutter speed, and other segments (not shown) for indicating the program mode, the diaphragm priority mode, the shutter speed priority mode, etc.

A strobe 31 is provided in the upper portion of the pentagonal prism on the body 11, so that when a strobe switch S provided on the side portion of the pentagonal prism housing is pushed, the strobe 31 projects from the body 11 to appear on the body 11. The quantity of light emitted by the strobe 31 is controlled in accordance with the total quantity of light received by the film. Namely, the quantity of light of strobe 31 is automatically controlled by the TTL automatic meter through strobe light receiving elements 32 which will be discussed hereinafter.

When a back cover 19 of the body 11 is opened as shown in FIG. 3, a cassette chamber 20, a film rewinding shaft 21, a sprocket 22, a spool 23 etc. can be seen. In the cassette chamber 20 a DX pin array 26 having a plurality of pins 26a for detecting the DX code of the film and a DX pin array 27 having a plurality of pins 27a for detecting the number of frames of film are provided.

The film rewinding shaft 21 is driven to be rotated by a film winding motor 39 upon rewinding of film. Upon advancing the film, the sprocket 22 and the spool 23 are driven to be rotated by a film feeding motor (not shown) incorporated in the camera body 11. When one (e.g. the film rewinding shaft 21) of the film rewinding shaft 21 and the sprocket 22 and the spool 23 is driven, the other members (e.g. the sprocket 22 and spool 23) are made free.

A back cover switch 25 is provided on the left end of the rear side of the body 11 in FIG. 3 to be made ON and OFF by the engagement of an abutment 24 provided on the free end of the back cover 19. In the body 11, a roller 26 which is coaxial to the sprocket 22 and which is rotatable independently of the sprocket 22 is provided, so that when the back cover 19 is closed, the roller 26 is brought into contact with the edge of the film to be rotated by the movement of the film.

Figure 6:
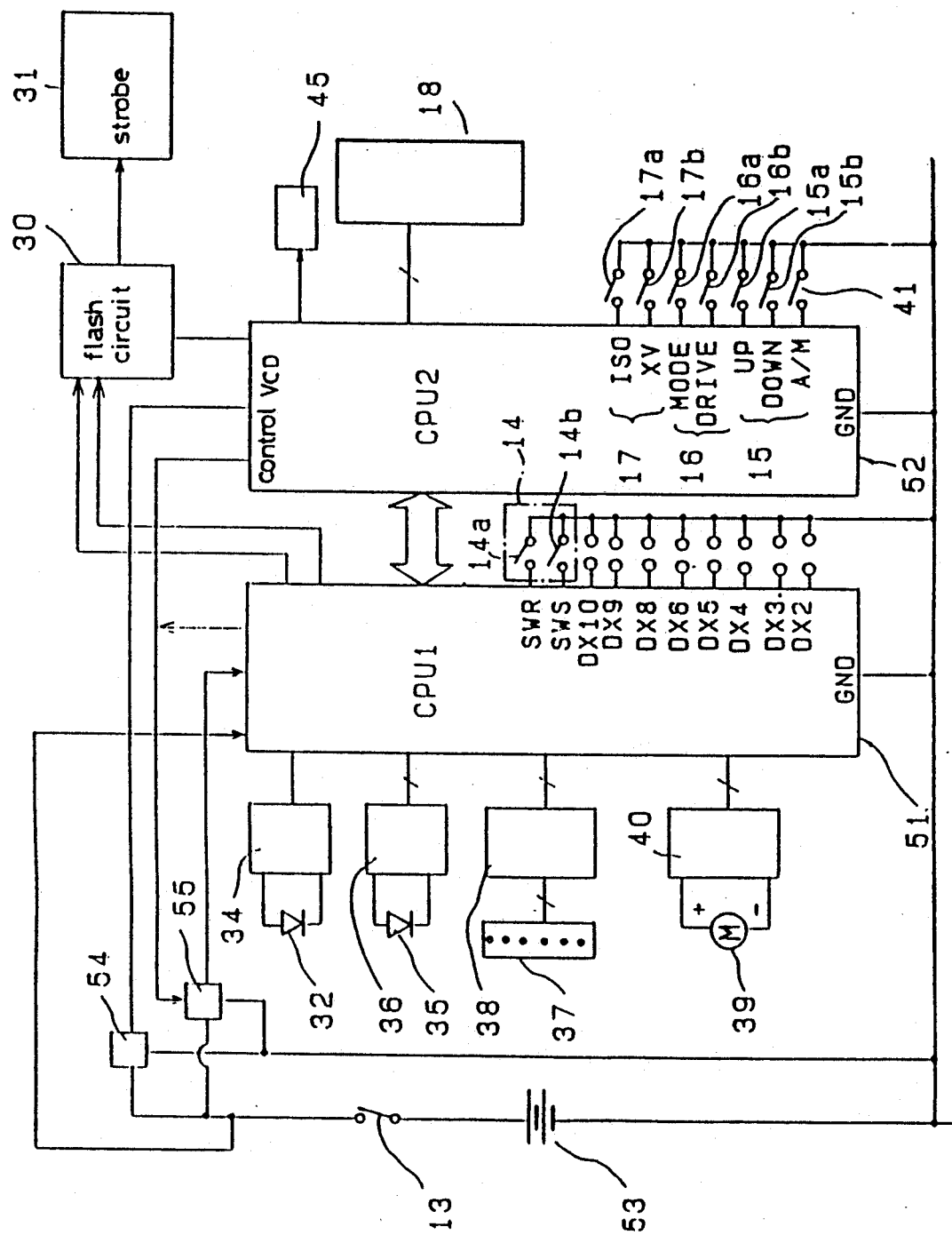
FIG. 6 is a block diagram of a control system of a single-lens reflex camera according to the present invention.

FIG. 6 shows a block diagram of a control unit of the single-lens reflex camera, in which numeral 30 designates a flash circuit for flashing the strobe 31, and numeral 32 designates a strobe light receiving element which receives light emitted by the strobe 31 and reflected by the object. These elements 30 and 31 are provided on the bottom of a mirror box (not shown) provided in the body 11.

Numeral 34 designates a strobe light receiving head amplifier which converts the current output of the strobe light receiving element 32 into a voltage signal, 35 a photometering light receiving element for measuring the brightness of the object, 36 a head amplifier for converting the current output of the photometering light receiving element 35 into a voltage signal which is in turn converted to a digital signal, and 37 an LED array provided in the finder to indicate the shutter speed, various modes, and exposure correcting value etc. The indication can be visibly confirmed through the finder. The LED array 37 is turned OFF so as not to indicate the shutter speed, etc. when the picture is taken at the AEB mode. Numeral 38 designates a driver of the LED array 37, 39 a film winding motor for winding the film, and 40 a driver of the film rewinding motor 39.

The shutter switch 14 has a release switch 14a and a photometer switch 14b. The up-down switch 15 has an up-switch 15a which is ON when pushed toward the UP side, and a down-switch 15b which is ON when pushed toward the DOWN side. The mode/drive lever 16 has a mode switch 16a which is ON when pushed toward the mode side, and a drive switch (first switch means) 16b which is ON when pushed toward the drive side. The ISO/exposure correcting lever 17 has an ISO switch 17a which is ON when pushed toward the ISO side and an exposure correcting switch (third switch means) 17b which is ON when pushed toward the ±EF side. Numeral 41 is an auto/manual switch which is turned ON and OFF by a pin (not shown) which is projected by the rotation of the ring 12a (FIG. 2) provided on the photographic lens (taking lens) 12, so that when the ring 12a is in a position shown in FIG. 2, the auto/manual switch 41 is made ON to provide an automatic mode, and when the ring 12a is in a position other than the above mentioned position shown in FIG. 2, the auto/manual switch 41 is made OFF to provide a manual mode. Numeral 45 designates a shutter circuit which actuates the shutter at a predetermined shutter speed.

Numeral 51 designates a main CPU (photographing control means) which performs AE, AF arithmetic operations, the control of the flash circuit 30 and the control of the film winding motor 39, and numeral 52 designates a sub-CPU which sets the modes in response to the operation of the switches 15, 16, 17 and 41 and controls the indication of the display panel 18 to indicate the set mode and the shutter speed, etc. The sub-CPU 52 and the main CPU 51 are interconnected to transfer the necessary data therebetween.

Numeral 53 designates a battery, 54 a regulator which applies a voltage to a Vcc terminal to continuously activate the sub-CPU 52 while the main switch 13 is actuated, and 55 a regulator which applies a voltage to the main CPU 51 in response to a control signal from the sub-CPU 52 to actuate the main CPU 51 when necessary.

The sub-CPU 52 has therein a RAM (memory means) which stores $Xvt = 8$ ($Xv = 0$) when it is initialized. The exposure correcting value $Xv$ is modified at a width of 0.5 when the ISO/exposure correcting value lever 17 is pushed in the direction of ±EF side to make the up-switch 15a or the down-switch 15b ON, as shown in Table 2 at the end of the specification. The modified exposure correcting value $Xv$ is indicated in the display panel 18. Note that the mechanism for modifying the exposure correcting value is not limited to the illustrated embodiment mentioned above. For instance, it is possible to store the exposure correcting value $Xv$ at an interval (width) of 0.5 between −4 and +4 so as to read it out in accordance with the operation of the up-down switch.

In the illustrated embodiment, for instance, when the up-switch 15a is made ON three times, the exposure correcting value $Xv$ changes as ±0→+0.5→+1→+1.5, so that the exposure correcting value of +1.5 is indicated and set. After that, when the down-switch 15b is made ON four times, the exposure correcting value changes as +1.5→+1→+0.5→±0→−0.5, so that the exposure correcting value of −0.5 is indicated in the display panel 18 and set.

Every time the up-switch 15a is made ON by pushing the ISO/exposure correcting value lever 17 toward the ±EF side at the AEB mode, the discontinuous (stepped) exposure correcting values of (±0.3)→±0.5→±1.0→ ... ±4.0 are indicated in the display panel 18 (Note: ±0.3 is an initial value). Thus, the exposure correcting values are read out from the sub-CPU 52 to use the same as discontinuous exposure correcting values.

The sub-CPU 52 functions as selecting means or drive mode setting means for successively selecting the drive modes, such as the self-mode, the single mode, the continuous photographing mode, the AEB mode, at every operation of the up-down switch 15 when the drive switch 16b is made ON, and functions as modifications means for modifying the exposure correcting value every operation of the up-down switch 15 when the exposure correcting switch 17b is made ON.

An exposure control apparatus is constituted as above.

The exposure control apparatus as constructed above operates as follows, with reference to FIGS. 7 through 14 showing flow charts of the operations.

First the main switch 13 is actuated to activate the sub-CPU 52 which causes the display panel 18 to indicate the present mode and which operates in accordance with a main diagram (not shown). In the main flow, the operations necessary for photographing are performed by successively transferring the drive mode up/down operating flow, ±EF indication operating flow, drive mode operating flow, incorporated flash operating flow etc. which are included in the sub-routine of the sub-CPU 52 shown in FIGS. 7-10 and FIG. 14. No detailed explanation of the main flow is given herein because the subject of the invention is not directly addressed thereto.

Figure 7:
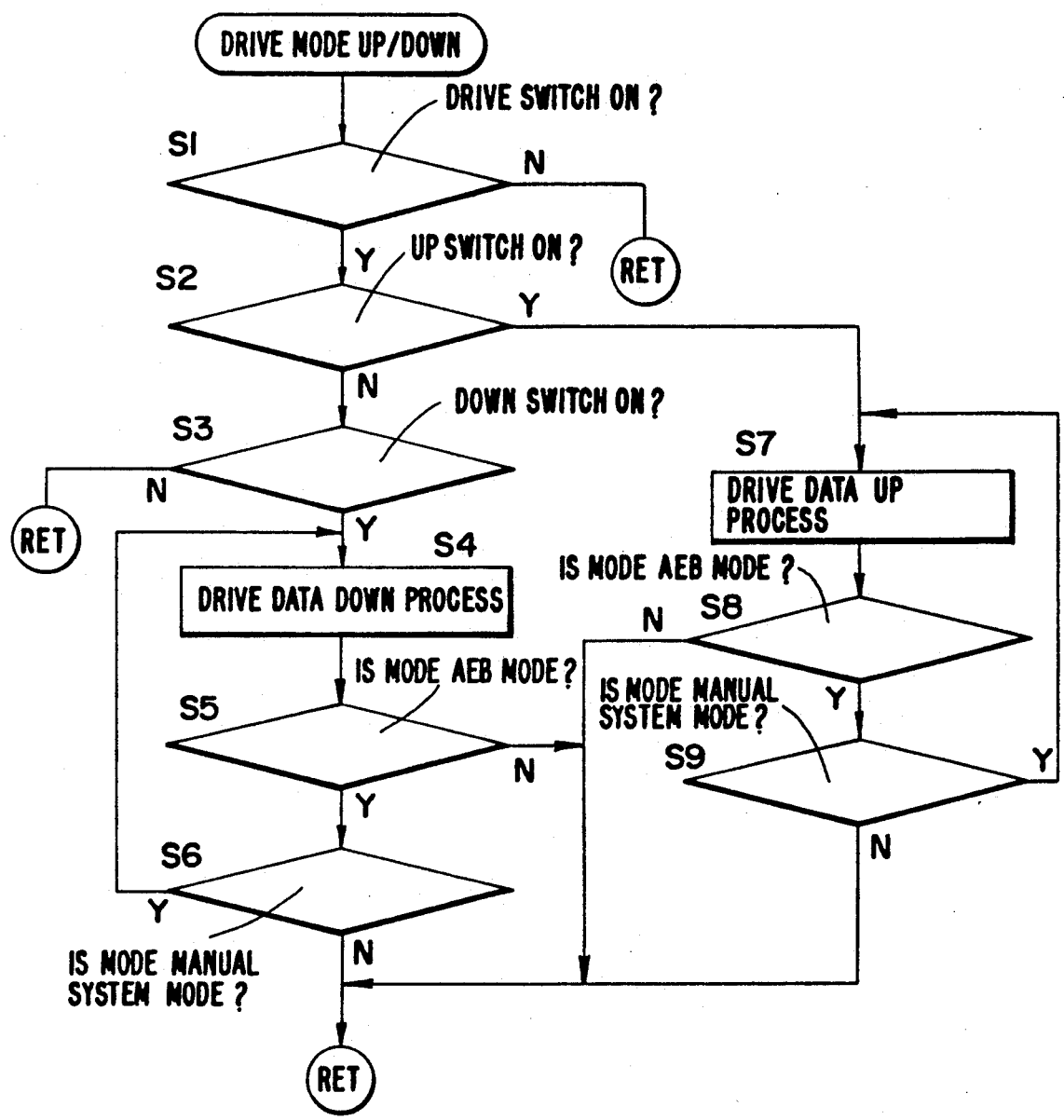
FIGS. 7 through 10 are flow charts of a sub-CPU according to the present invention.

When the control proceeds to the drive mode UP/DOWN operating flow diagram shown in FIG. 7 from the main flow mentioned above, whether or not the drive lever 16 is moved to the drive side is checked at step S1. Namely, whether or not the drive switch 16b is ON is checked. If the drive switch 16b is not ON control is returned to the main flow. On the contrary, if the drive switch 16b is ON, control proceeds to step S2 at which whether or not the up-switch 15a of the up-/down lever 15 is ON is checked. If the up-switch 15a is ON control proceeds to step S7 for drive data up process and if the up-switch 15a is not ON control proceeds to step S3. At step S3, whether the down switch 15B is made ON is checked. If the down-switch 15b is not ON, control is returned to the main flow, since neither the up-switch 15a nor the down-switch 15b are actuated. If the down-switch 15b is ON, control proceeds to step S4 for drive data down process. At step S4, the down process of the drive data is performed. The down process of the drive data referred to herein means a process in which every time the down-switch 15b is ON, for example the drive modes are successively changed between the self-timer mode, the single mode, the continuous photographing mode, and the AEB mode.

At step S5 whether the drive mode is the AEB mode is checked. If the mode in not the AEB mode, the control is returned to the main flow, and if the mode is the AEB mode, control proceeds to step S6. At step S6, whether the exposure mode is a manual system mode (manual mode, bulb mode, constant speed mode) is checked. If the exposure mode is the manual system mode, control is returned to step S4, and if it is not the manual system mode, control is returned to the main flow.

At step S7, the up process of the drive data is performed. The up process of the drive data referred to herein means a process in which the drive modes are successively changed between the AEB mode, the continuous photographing mode, the single mode, the continuous photographing mode, and the AEB mode in this orders which is opposite to the order mentioned above every time the up-switch 15a is actuated. Alternatively, it is also possible to successively switch the drive modes at a predetermined interval of time while the switch 15a or 15b is actuated.

At step S8, whether the mode is the AEB mode is checked. If the mode is not the AEB mode, control is returned to the main flow, and if the mode is the AEB mode, control proceeds to step S9 at which whether the exposure mode is the manual system mode is checked. If the exposure mode is the manual exposure mode, the control is returned to step S7. On the contrary, if the exposure mode is not the manual system mode, control is returned to the main flow.

In case of the selection of the AEB mode by the drive switch 16b etc., if the photographing mode is the manual system mode, no AEB operation can be effected, and accordingly, a loop of step S4→step S5→step S6, or a loop of step S7→step S8→step S9 is repeated, so that no setting of the AEB mode is performed.

Figure 8:
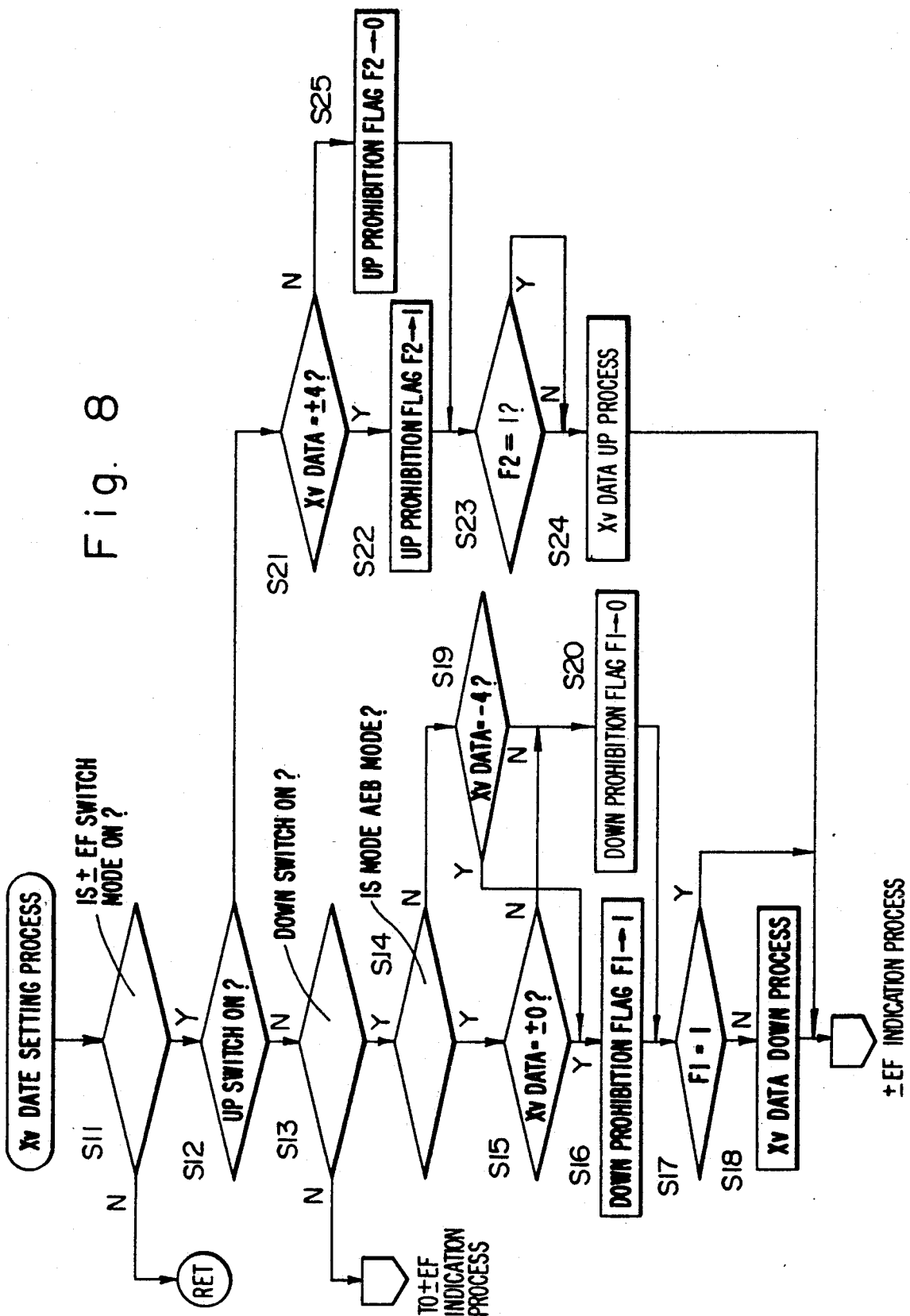

FIG. 8 shows a flow chart of the Xv data setting operation for setting the exposure correcting value Xv when the exposure correcting switch 17b is ON. At step S11, whether the exposure correcting switch 17b is ON is checked. If the answer is negative, control is returned to the main flow, and if the answer is affirmative, control proceeds to step S12. At step S12, whether the up-switch 15a is ON is checked. If the up-switch 15a is ON, control proceeds to step S21, and if not ON, control proceeds to step S13.

At step S13, whether the down-switch 15b is ON is checked, so that if it is not made ON, control proceeds to the EF indication operation flow which will be described hereinafter. If the down-switch 15b is ON, control proceeds to step S14 at which whether the mode is the AEB mode is checked. If the mode in not the AEB mode, control proceeds to step S19 and if the mode is the AEB mode, control proceeds to step S15.

At step S15, whether the exposure width setting value is $\pm 0$ ($X_{VT}$ code=01000B) is checked. If the value is not $\pm 0$, the control proceeds to step S20 at which the down prohibition flag is made "0". Conversely, if the value is $\pm 0$, the control proceeds to step S16 at which the down prohibition flag is made "1".

The lower limit of the exposure width setting range at the AEB mode is $+/-0.3$, but the $X_v$ data at step S15 is $+/-0$ ($X_{vt}$ code=01000B), and accordingly the value exceeding the same may be set at the down process. This is the reason that the down prohibition flag is made "1".

At step S19, whether the exposure correcting value $X_V$ is $-4$ ($X_{VT}$ code=10000B) is checked. If the exposure correcting value $X_V$ is not $-4$, control proceeds to step S20. On the contrary, if the exposure correcting value $X_V$ is $-4$, control proceeds to step S16 to make the down prohibition flag "1". Since the exposure correcting value $X_V$ can be stepwise set at an interval of width of 0.5 in the range from $+4$ ($X_{VT}$ code=00000B) to $-4$ ($X_{VT}$ code=10000B), when the exposure correcting value $X_V$ is set to be $-4$ ($X_{VT}$ code=10000B) which is the lower limit, no value below the lower limit can be set. This is the reason that the down prohibition flag is made "1".

At step S17, whether the down prohibition flag is "1" is checked. If the down prohibition flag is "1", no down process if performed, so that control proceeds to the EF indication operation flow. On the contrary, if the down prohibition flag is not "1", control proceeds to step S18 at which the down process (up process of $X_VT$ code) of the exposure correcting value $X_V$ is performed to perform the $\pm EF$ indication.

On the other hand, if the up-switch 15a is ON, so that control proceeds to step S21 at which the exposure correcting value is $+4$ is checked. If it is not $+4$, control proceeds to step S25 at which the up prohibition flag is made "0". On the contrary, if the exposure correcting value is $+4$, control proceeds to step S22 to make the up prohibition flag "1". At step 22, the up prohibition flag is made "1" to prohibit a further up operation of the exposure correcting value when the exposure correcting value is set to be $+4$ or the exposure width is set to be $\pm 4$ ($X_{VT}$ code=0).

When the control proceeds to step S23 from steps S22 and S25, whether the prohibition flag is "1" is checked. If the up prohibition flag is "1", control proceeds to the EF indication processing flow without the up operation, and if the up prohibition flag is not "1", the control proceeds to step S24 to perform the up operation (the down operation of the $X_{VT}$ code) of the exposure correcting value $X_V$ and proceeds to the $\pm EF$ indication processing flow.

In steps S12 through S18, a decrement of the exposure correcting value $X_V$ up to $-4$ by 0.5 can be effected every time the down-switch 15b is turned ON to select an optional exposure correcting value. On the other hand, in steps S21 through S24, an increment of the exposure correcting value $X_V$ up to $+4$ by 0.5 can be effected every time the up-switch 15a is turned ON to select an optional exposure correcting value $X_V$. In case of the AEB mode, the exposure correcting value $X_V$ can be selected between $+4$ and 0 at an interval of 0.5 by the up-switch 15a and the down-switch 15b in accordance with the whole flow chart.

Figure 9:
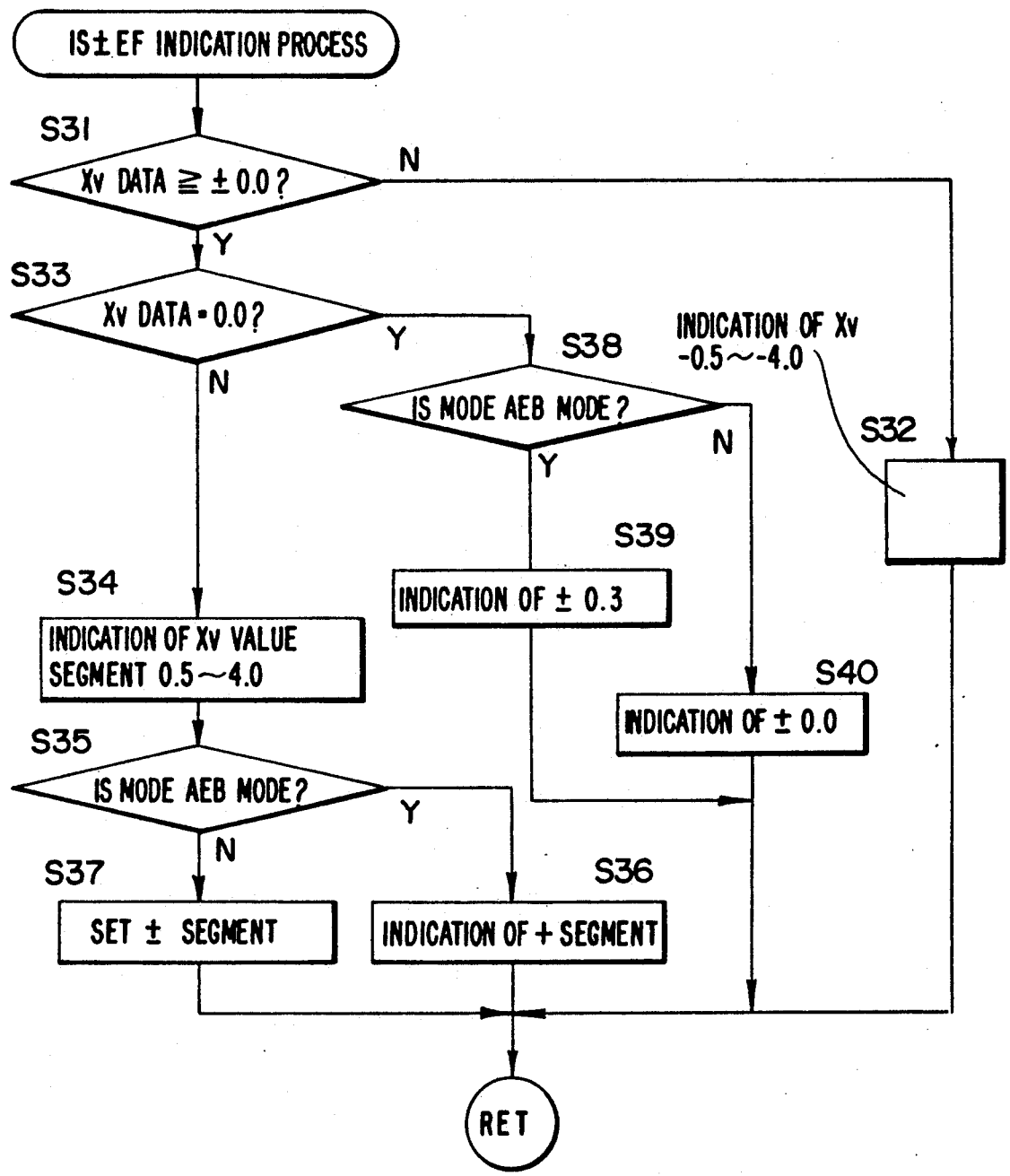

The following discussion will be directed to the $\pm EF$ indication processing flow shown in FIG. 9.

At step S31, whether the exposure correcting value $X_V$ (or exposure correcting width) is more than 0 is checked (i.e. below $X_{VT}$ code 01000B). If the value is below 0 (below $X_{VT}$ code 01000B), the control proceeds to step S32 at which a minus exposure correcting value $X_V$ ($-0.5 \sim -4.0$) which is selected in the $X_V$ data setting processing flow mentioned above is indicated in the display panel 18, so that the control is returned to the main flow. At step S33, whether the exposure correcting value is 0 is checked, so that if it is 0, control proceeds to step S38 and if not 0, control proceeds to step S34.

At step S34, a plus exposure correcting value $X_V$ ($0.5 \sim 4.0$) which is selected in the above mentioned $X_V$ data setting processing flow is displayed in the display panel 18, and then control proceeds to step S35. At step S35, whether the mode is the AEB mode is checked. If the mode is not the AEB mode, but control proceeds to S36 and if the mode is the AEB mode, the control proceeds to step S37. At step S36, the exposure correcting value $X_v$ which is indicated in the display panel 18 is given an plus sign (+), so that the control is returned to the main flow. In case of the AEB mode, at step S37, the exposure correcting value $X_v$ indicated in the display panel 18 is given an sign ± to set "completion of setting of $X_v$", so that the control is returned to the main flow.

At step S38, whether the mode is the AEB mode is checked. If it is the AEB mode, ±0.3 is indicated (step S39) and thereafter control is returned to the main flow. Conversely, if the mode is not the AEB mode, ±0.0 is indicated (step S40), and thereafter the control is returned to main flow.

At step S39, ±0.3 which is an initial value of the discontinuous exposure correcting value is indicated when the exposure correcting value $X_v$ is selected to be 0 at the AEB mode.

This flow is for indicating that the discontinuous exposure at the set width of the exposure correcting value is effected by indicating ± in the display panel 18 when the AEB mode is set.

Figure 10:
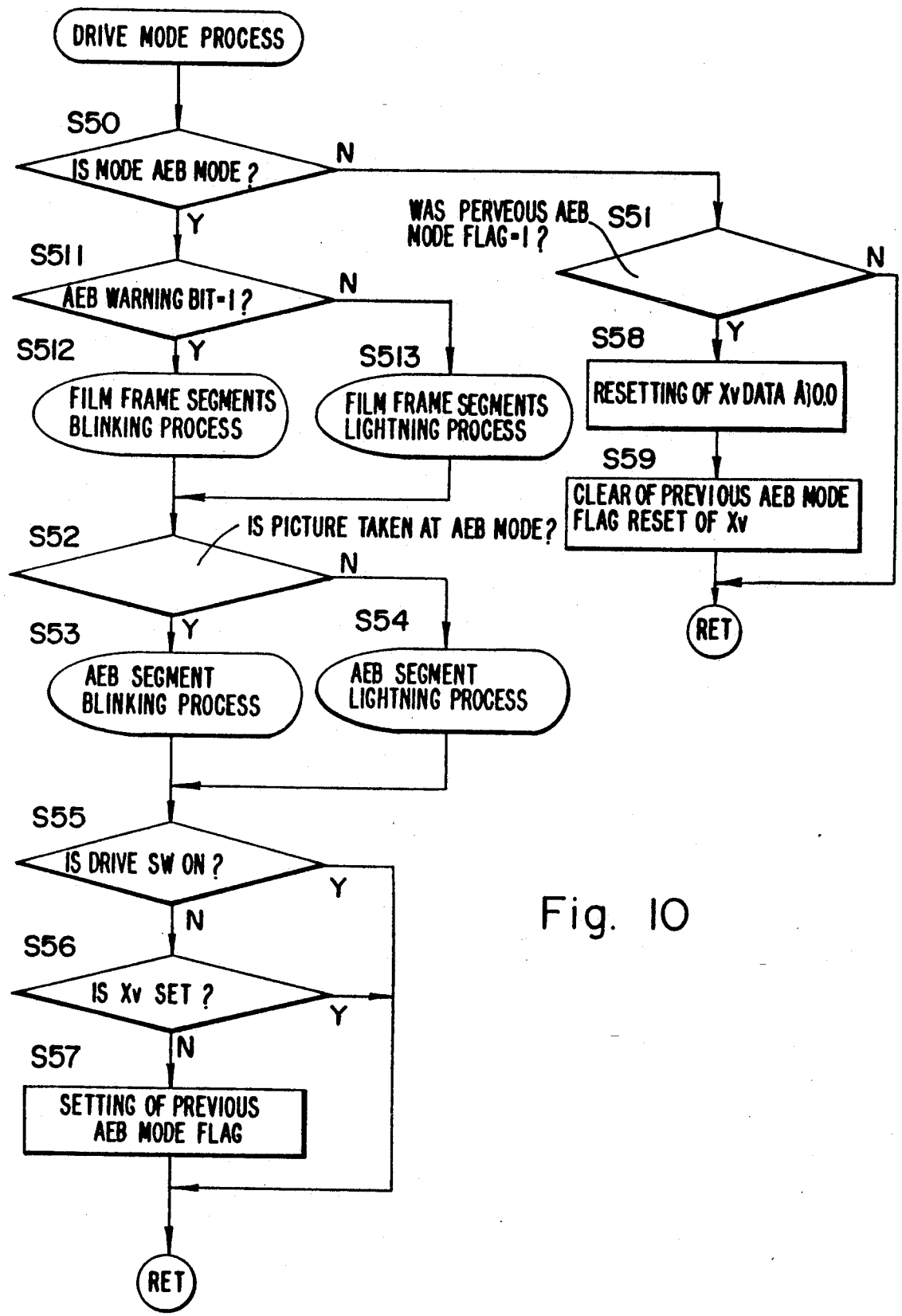

FIG. 10 shows a flow chart of the drive mode process.

Figure 12:
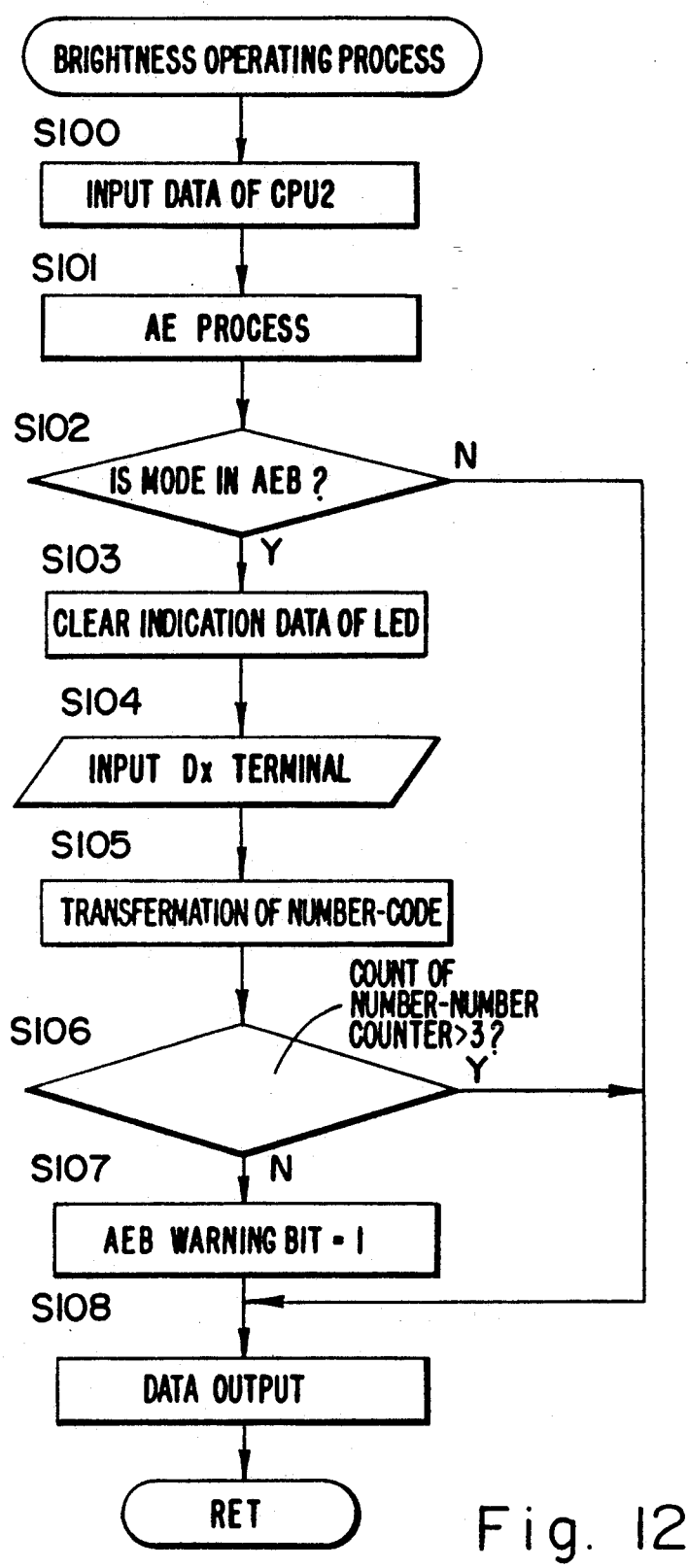

At step S50, whether the mode is AEB mode is checked. If the answer is NO, control proceeds to step S51, and if the answer is YES, control proceeds to step S511. At step S511, whether the AEB warning bit is set to "1" is checked. If the AEB warning bit is set to "1", the remaining film frame segments on the display panel 18 blink, in step S512, since photographing in the AEB mode cannot be performed when less than three frames of film remain. If the AEB warning bit is set to "0", the film frame segments on the display panel 18 are continuously lightened, in step S513, since the photographing at the AEB mode can be performed when the remaining film frames are remained three or more. The AEB warning bit is set at step S107 in photometer arithmetic processing flow, as shown in FIG. 12.

At step S52, whether the picture is taken at the AEB mode is checked. If photographing is not effected at the AEB mode, control proceeds to step S54 at which the AEB segment 18d is lightened. If photographing is effected at the AEB mode, control proceeds to step S53 at which the AEB segment 18d blinks. Namely, in case of taking a picture at the AEB mode, the AEB segment 18d is OFF. If no photographing is effected at the AEB mode, the AEB segment 18d is lightened.

At step S55, whether the drive switch 16b has been turned ON by pushing the mode/drive lever 16 is checked. If the drive switch 16b is ON, control is returned to the main flow and if it is not ON control proceeds to step S56. At step S56, whether the operation of setting of the exposure correcting width $X_v$ is performed after the selection of the AEB mode is checked. At step S55, even if the drive switch or the up-down switch is pushed to transfer the drive mode to another mode and pass to the AEB mode when the exposure correcting value is set at a mode other than the AEB mode, the stored exposure correcting value is maintained.

If the answer is YES at step S56, control is returned to the main flow, and if the answer is NO, control proceeds to step S57. At step S57, the exposure correcting value $X_v$ is reset to be 0 and "previous AEB mode flag" is set, and then control is returned to the main flow.

On the other hand, if the mode is not the AEB mode, whether the "previous AEB mode flag" is checked at step S51. If the "previous AEB mode flag" is "0", control is returned to the main flow, and "previous AEB mode flag" is "1", control proceeds to step S58. At step 58, since the photographing at the AEB mode is finished, the exposure correcting value $X_v$ is reset to be 0.0 and then the control proceeds to step S59. At step S59, the "previous AEB mode flag" is cleared, so that the completion of setting of $X_v$ is reset. After that, control is returned to the main flow.

At steps S56 and S57, the exposure correcting width is initialized prior to setting of of the exposure width when the drive switch 16b is turned OFF at the AEB mode, and the exposure correcting value is used as it is after the exposure width is set or when the drive switch 16b is ON, respectively.

At steps S50, S51 and S58, whether the mode is changed from the AEB mode to other mode is checked, so that if the another mode is set, the exposure correcting value is reset to be 0.

Figure 11:
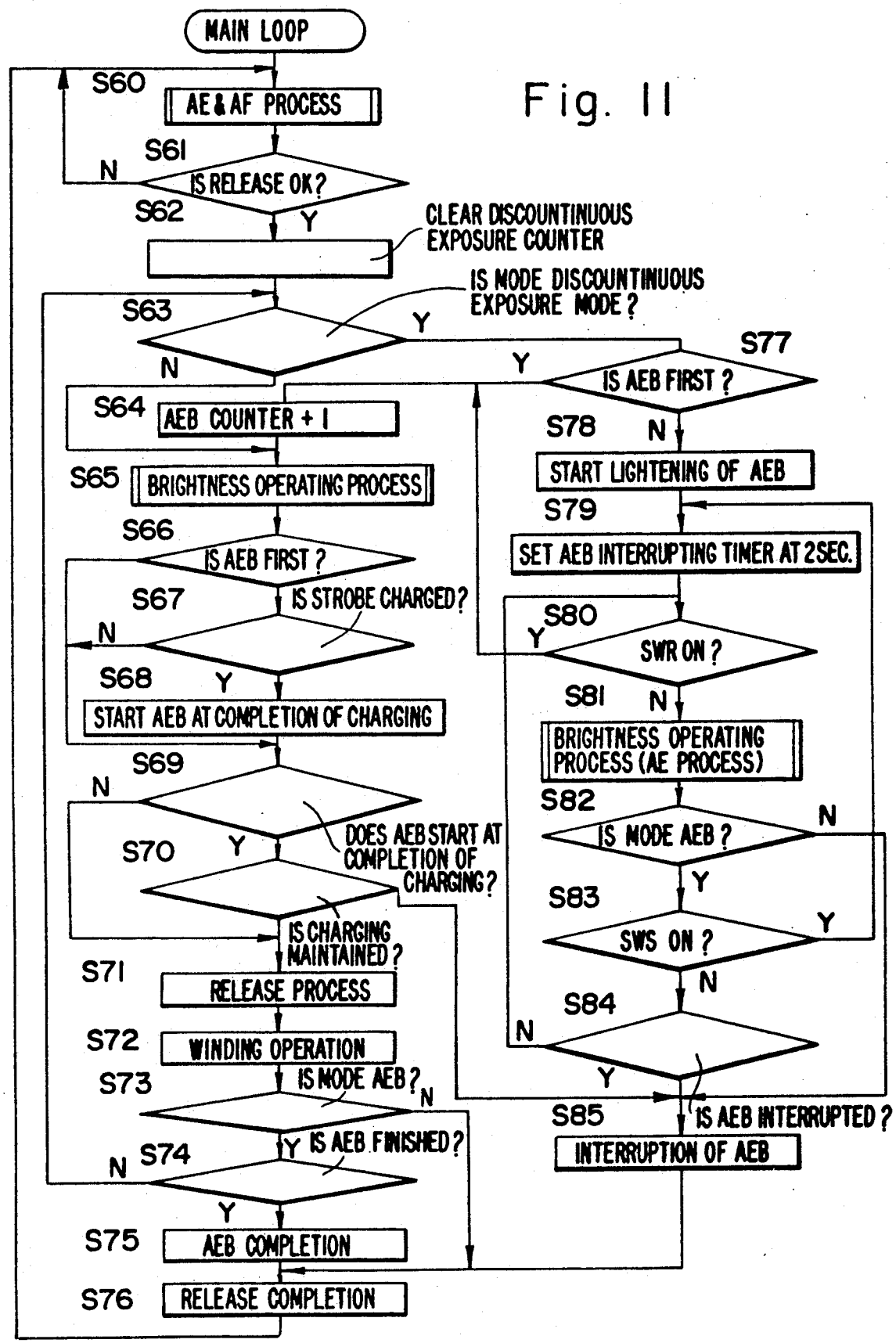
FIGS. 11 through 13 are flow charts of a main CPU according to the present invention.

FIG. 11 shows a main flow chart of the main CPU 51.

When the shutter switch 14 is pushed down by a half step to turn the photometer switch 14b ON, electrical power is supplied to perform the main flow after step S60 subsequent to the initialization.

At step S60, the photometer arithmetic arithmetic operation is mainly performed, so that the control then proceeds to step S61. The operations performed in step S60 actually includes the AF operation which is however not the subject of the present invention and accordingly which is not explained herein.

At step S61, whether the release switch 14a is actuated by a full step of down movement of the shutter switch 14 and whether the release can be performed in view of the release conditions performed at step S60 are checked. If the release operation can be performed, the control proceeds to step S62 and if the release operation cannot be performed, control proceeds to step S60. Namely, at steps S60 and S61, the photometer arithmetic indication process, etc., prior to the release operation are continued. At step S62, the discontinuous exposure counter (AEB counter) is cleared to be set to 0. At step S63, whether the mode is the stepwise exposure mode, i.e., the AEB mode is checked. If the answer is YES, control proceeds to step S77 and if the answer is NO, control proceeds to step S65. At step S65, the photometer arithmetic process is performed. After that, the control proceeds to step S66, at which whether the photographing at the discontinuous exposure is first checked. If the answer is NO, control jumps to step S69, and if the anser is YES, control proceeds to step S67.

At step S67, whether the electrical charge of the strobe 31 is completed by pushing the strobe switch S is judged. If no charge is completed, control jumps to step S69 and if the charge is completed, control proceeds to step S68. At step S68, the commencement of the AEB photographing at the completion of the electric charge is memorized, so that the control proceeds to step S69. At step S69, the completion of the electric charge at the start of the AEB photographing is checked. If no charge is completed, the control proceeds to step S71 and if the charge is completed, the control proceeds to step S70 at which whether the completion of the electric charge is maintained is judged. If the answer is NO, the control jumps to step S85 and if the answer if YES, the control proceeds to step S71. Namely, the processes from step S66 to step S70 are for interrupting the remaining AEB photographing when no flash photographing can be effected during the AEB photographing.

At step S71, the LED in the finder is turned OFF, so that the release operation is performed for controlling the exposure in accordance with predetermined shutter speed and diaphragm for photographing at the AEB mode or other modes. The film is wound at step S72. At step S73, whether the mode is the AEB mode is judged, so that if the answer is NO, control jumps to step S76 and if the answer is YES, control proceeds to step S74. At step S74, whether the discontinuous exposure counter is 3, i.e., whether the photographing at the AEB mode is completed is checked. If photographing is not finished, control is returned to step S63 and if photographing is finished, control proceeds to step S75.

At step S75, the AEB completion operations including the completion of lightening of the AEB segment 18d, and clearing operation of the AEB counter are performed. After that, the control proceeds to step S76 at which the release completion operations, such as the setting of the release completion flag, the clearing of the bits during releasing, the clearing of the SWR memory bits, etc. are performed. After that, the control is returned to step S60. At step S75, the completion operation is performed while memorizing the AEB mode without releasing the AEB mode. This makes possible for a photographer to continuously take pictures at the AEB mode.

In case of the AEB mode, the control proceeds to step S77 from step S63, so that whether the photographing at the AEB mode is the first photography, is checked at step S77. Namely, whether the count of the discontinuous exposure counter is 1 is checked. If the counter is 1, control proceeds to step S64 and if the counter is not 1, control proceeds to step S78. At step S64, the value of the AEB counter is set to 1, so that the photometer arithmetic processes to provide proper exposure, under exposure, and over exposure are made possible at the next step S65. At step S78, the AEB segment 18d is discontinuously lightened to indicate the AEB mode.

At step S79, the interrupting timer, which interrupts the photographing in the AEB mode upon lapse of a predetermined period of time after the photometer switch 14b is turned ON during the AEB photographing, is set to be 2 seconds. At step S80, whether the release switch 14a is ON in judged, so that if it is ON, control is returned to step S64 and if the switch 14a is not ON, control proceeds to step S81. At step S81, the photometer arithmetic operation is performed to indicate the exposure correcting value for the present AEB photographing in the display panel 18. The LED in the finder is kept OFF unless the AEB counter is cleared.

At step S82, whether the mode is the AEB mode, i.e., whether the AEB mode is released is judged. If the AEB mode is not released, control jumps to step S85 and if released, control proceeds to step S83.

In case of the AEB mode, at step S83, whether the photometer switch 14b is ON is checked. If the photometer switch 14b is ON, the control is returned to step S79, so that the AEB interrupting timer is set again to be 2 seconds. If the photometer switch 14b is not made ON, the control proceeds to S84 at which a lapse of 2 seconds of the interrupting timer is checked. Namely, whether 2 seconds has lapsed after the finger is released from the shutter switch 14, that is, whether the AEB mode is interrupted for more than 2 seconds is checked.

If no interruption for more than 2 seconds takes place, control is returned to step S80, and if the AEB mode is interrupted for more than 2 seconds, control proceeds to step S85. At step S85, the intermittent lightening of the AEB segment 18d ends, so that the AEB counter is cleared and then the control proceeds to step S76 for release completing operations.

The loop from step S79 to step S84 is adapted to stop photographing at the AEB mode when the finger is released from the shutter switch 14 after the first photographing of the AEB exposure to turn the release switch 14a OFF and continue photographing at the AEB mode when the release switch 14a is made again ON. Also, if the photometer switch 14b is not turned ON for more than 2 seconds after it is turned OFF, the AEB mode is interrupted by the loop of steps S79 to S84 as mentioned above.

For the first photographing in the AEB mode, the photographing process of the loop of step S63→step S77→step S64→step S74→step S63 is performed. For the second photographing, the photographing process of the loop of step S63→step S77→step S80→step S64→step S74→step S63 is performed. Similarly, for the third photographing, the photographing process of the loop of step S63→step S77→step S80→step S64→step S76 is performed.

When the control comes to steps S60, S65 and S81, the photometer arithmetic processing flow is performed, as shown in FIG. 12.

At step S100 of the photometer arithmetic processing flow, the data of the sub-CPU 52 is input, so that the AE arithmetic operation is performed based on the input data at step S101. At step S102, the photographing at the AEB mode is checked. If the photographing is at the AEB mode, the control proceeds to step S103 and if the photographing is not at the AEB mode, control jumps to step S108.

At step S103, the LED indication data of the main CPU 51 is cleared, and then at step S104, the DX code concerning the number of frames of film is read out by the DX pin array 27. After that, the DX code thus read out is converted to the number of frames of film at step S105. After that, at step S106, whether the difference between the number of frames of film and the number of frames of film which have been already taken is more than three is checked. If the difference is more than 3, control jumps to step S108, and if the difference is not more than 3, control proceeds to step S107. At step S107, it is indicated that when the number of remaining frames of film is less than three, if photographing in the AEB mode is continued, the photographing is finished before the end of the frames. Namely, the bit for warning the shortage of the frames of film necessary for the photographing at the AEB mode is set to be "1". At step S108, the data of the main CPU 51 is transferred to the sub-CPU 52, so that the control is returned.

It should be appreciated that the exposure correcting values $X_V$ can be modified in a discontinuous (stepped) fashion at an interval of 0.5 between −4 and +4, as mentioned before and as shown in Table 2. Table 2 (at the end of the specification) shows $X_{VT}$ code and $X_{VD}$ corresponding to the exposure correcting values $X_V$. The $X_{VT}$ code is represented by a binary digit of 4-$X_V$, and $X_{VD}$ are values weighed with $\frac{1}{2}, \frac{1}{4}$ of bits of lower digit of $X_{VT}$ code (i.e. value of $X_{VT} \times 4$). The $X_{VT}$ codes are used to make a transmission of data between the main CPU 51 and the sub-CPU 52. The $X_{VD}$ codes are used to perform the arithmetic operation of the main CPU 51.

Table 1 (at the end of the specification) shows $X_{VT}$ code and discontinuous exposure correcting value $\pm EV$ corresponding thereto. The $X_{VT}$ codes are identical to the $X_V$ codes of parts of exposure correcting values $X_v$ that are above 0. The discontinuous exposure correcting values $\pm E_V$ can be set utilizing the exposure correcting values $X_V$ which are set in the RAM of the sub-CPU 52 by the operation of the up-down switch 15.

Namely, when the exposure correcting values $X_V$ which are set in the RAM of the CPU 52 are modified by the operation of the up-down switch 15, the $X_{VT}$ code signals corresponding to the modified exposure correcting values $X_V$ are transmitted to the main CPU 51 from the sub-CPU 52, so that main CPU 51 determines the $X_{VD}$ corresponding to the $X_{VT}$ code, whereby the discontinuous exposure correcting values $\pm EV$ can be set by operationg the $X_{VD}$ thus obtained in accordance with the AEB flow which will be mentioned hereinafter.

Figure 13:
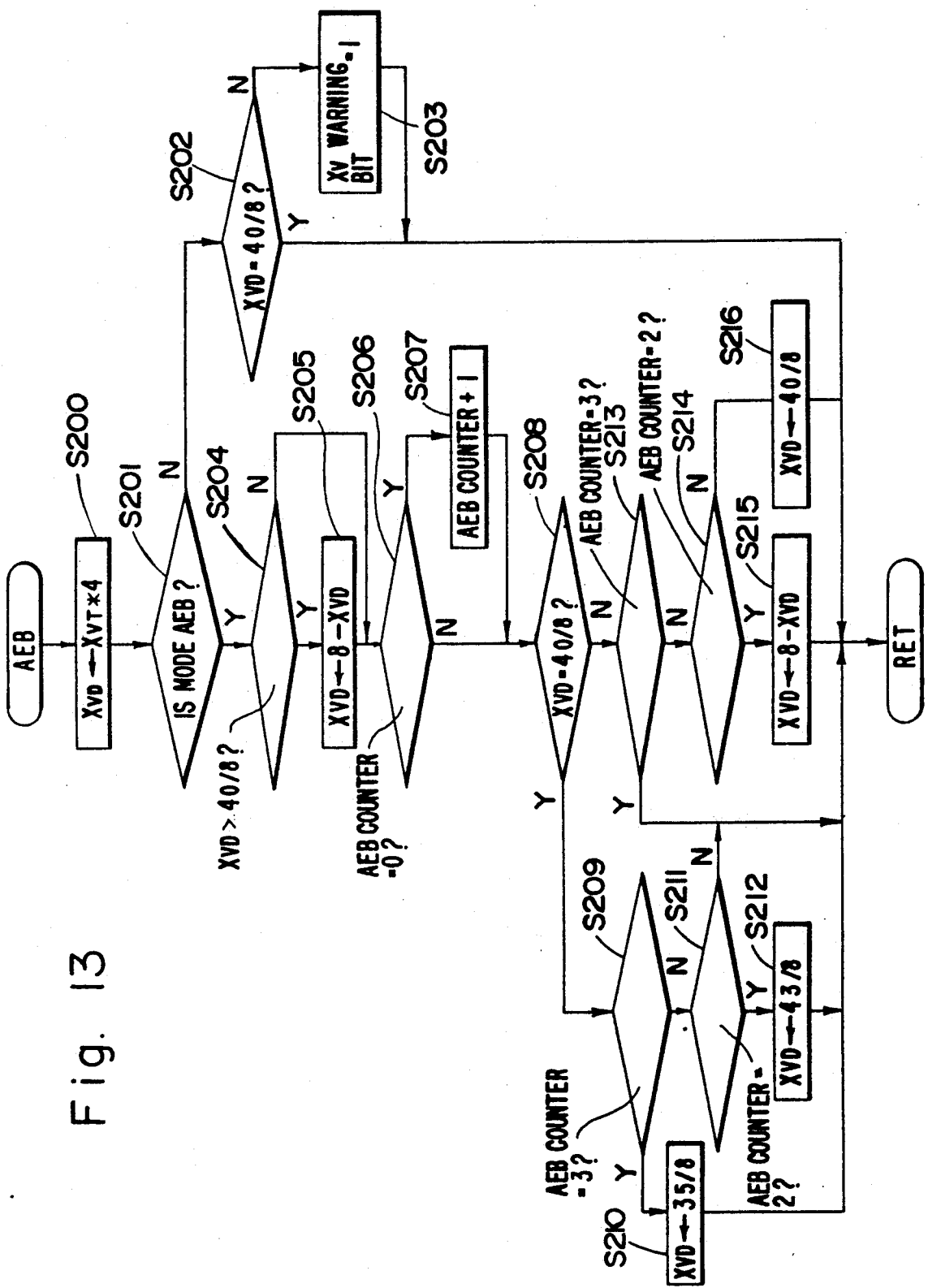

FIG. 13 shows the AEB flow, in which at step S200, the main CPU 51 performs the arithmetic operation of $X_{VT} \times 4$ when the $X_{VT}$ code signals corresponding to the exposure correcting value $X_V$ set by the operation of the up-down switch 15 are transmitted from the sub-CPU 52 to the main CPU 51, so that the $X_{VD}$ can be set. At step S201, whether the mode is AEB mode is checked. If the mode is not the AEB mode, the control proceeds to step S202 at which whether $X_{VD}$ is 4 and 0/8, i.e. whether the exposure correction is performed is checked. If the answer is NO, the $X_V$ warning bit for an intermittent lightening is output and then control is returned. On the contrary, if the answer is YES at step S202, control is directly returned.

If the exposure correction is effected when the mode is not the AEB mode, the exposure correcting values $X_V$ are lightened by the LED array 37 in the finder to warn of the same.

At step S201, if the mode is the AEB mode, the control proceeds to step S204 at which whether the $X_{VD}$ is more than 4 and 0/8 is checked. If $X_{VD}$ is not more than 4 and 0/8, the control jumps to step S206, and if $X_{VD}$ is more than 4 and 0/8, the control proceeds to step S205. At step S205, $8 - X_{vd}$ is reset as a new $X_{vd}$. If a negative $X_v$ value is set by an error, the $X_V$ value is inverted to a positive $X_V$ value at steps S204 and S205.

At step S206, whether the count of the AEB counter is zero is checked, and if the count is not 0, an increment of the AEB counter is performed (step S207) and then control proceeds to step S208. If the count is zero at step S206, control proceeds to step S208. At step S208, whether the $X_{VD}$ is 4 and 0/8 is checked. If the $X_{VD}$ is 4 and 0/8, the control proceeds to step S209, and if it is not 4 and 0/8, control proceeds to step S213. At step S209, whether the count of the AEB counter is 3 is checked, that is, whether a third picture is being taken at the AEB mode is checked. If the count is 3, the control proceeds to step S210 at which the $X_{VD}$ is set to be 3 and ⅜ and the control is returned. Namely, the third picture is taken at an over exposure. If the count is judged not to be 3 at step S209, the control proceeds to step S211 at which the count of the AEB counter is 2 is checked. If the count is not 2, the control is returned and if the count is 2, the control proceeds to step S212 at which the control is returned after the $X_{VD}$ is set to be 4 and ⅜. Namely, the second picture is taken at an under exposure.

If the $X_{VD}$ is not 4 and 0/8 at step S208, control proceeds to step S213 at which whether the count of the AEB counter is 3 is checked, i.e. whether a third picture is being taken at the AEB mode is checked. If the count is 3, control is returned and if the count is not 3, control proceeds to step S214. At step S214, whether the count of the AEB counter is 2 is checked, i.e. whether a second picture is being taken at the AEB mode is checked. If the count is 2, the control proceeds to step S215 and if not 2, the control proceeds to step S216. At step S215, the $X_{VD}$ is substracted from 8, so that the value of $(8 - X_{VD})$ is set to be a new $X_{VD}$. Consequently, the sign of the $X_{VD}$ is Inserted.

This process is to set an under exposure. For example, the $X_{VD}$ is 3 and 0/8, namely, $X_V = +1$, the subtraction of 8 from the $X_{VD}$ is 5 and 0/8. That is, $X_V = -1$ is set. At step S216, the $X_{VD}$ is set to be 4 and 0/8 ($X_V = 0$), and control is returned.

In steps S209 through S212, the $X_{VD}$ is 4 and 0/8 when the exposure correcting value $X_V$ is 0, namely, when no exposure correcting value is set, and accordingly, the initial value $\pm 0.3$ of the discontinuous exposure value is set based on the $X_{VD}$. Note that 3 and ⅜ of step S210 mean $4 - ⅜$. In the illustrated embodiment, since the precision is ⅛, ⅜ which is closest to 3/10 (0.3) is used in place thereof. Similarly, 4 and ⅜ at step S212 mean $4 + ⅜$, which depends on the precision of the exposure.

At step S210, the over exposure is set for the third picture at the AEB mode. At step S212, the under exposure is set for the second picture at the AEB mode. Since the first picture at the AEB mode is under a proper exposure, the control is directly returned from step S211.

At step S215 in which the second picture is being taken at the AEB mode, the under exposure having a discontinuous exposure value other than the initial value is set. At step S216 in which the first picture at the AEB mode is being taken, an appropriate exposure value is set. Since the third picture of the AEB mode which is taken at a discontinuous exposure value other than the initial value is at an over exposure, and accordingly the control is returned directly from step S213.

Based on the $X_{VD}$ values which are set at steps S200, S210, S212, S215, and S216, the discontinuous exposure correcting value of $\pm EV$ shown in Table 1 is set, so that the discontinuous exposure correcting value $\pm EV$ can be indicated in the display panel 18. The picture can be thus taken at the set discontinuous exposure correcting value $+/-EV$.

As can be understood from the foregoing, in the present invention, no special switch is necessary for setting the discontinuous (stepped) exposure correcting value $\pm EV$, based on the exposure correcting values stored in the RAM of the CPU 52 in accordance with the operation of the up-down switch 15.

Figure 14:
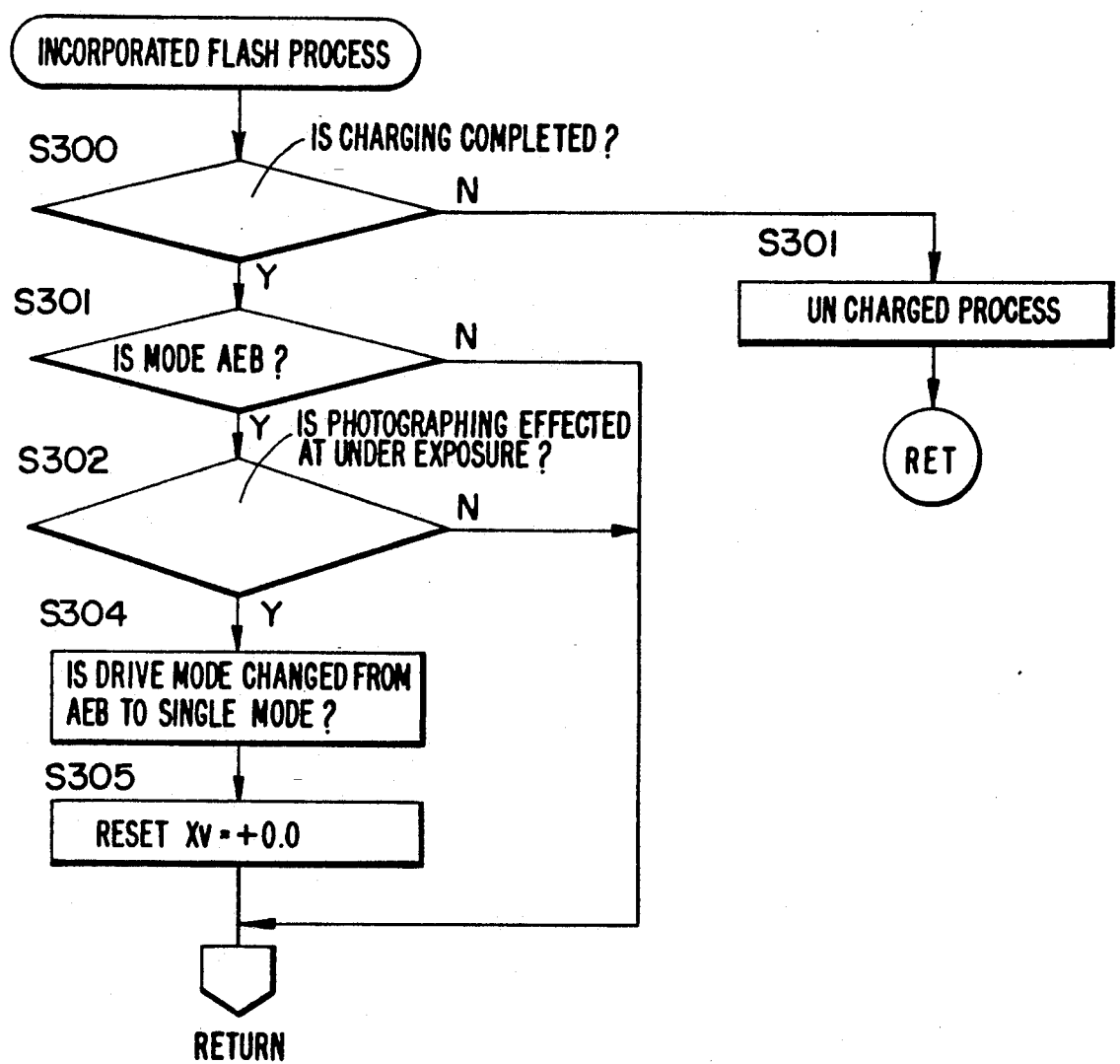
FIG. 14 is a flow chart of a sub-CPU according to the present invention.

FIG. 14 shows a sub-routine of the CPU 52 for the incorporated flashing process.

At step S300, whether the electrical charging for flashing the strobe is completed is checked. If the charging is not yet completed, the control proceeds to step S301 at which the operation of the incompletion of the charging is performed. After that, the control is returned. If the charging is completed at step S300, the control proceeds to step S302 at which whether the mode is AEB mode is checked. If the mode is not the AEB mode, the control is returned, and if the mode is the AEB mode, the control proceeds to step S303. At step S303, whether the exposure is checked is an under-exposure. If not, the control is returned, and if the exposure is the under-exposure, the control proceeds to step S304. At step S304, the drive mode is switched from the AEB mode to the single mode, so that the exposure correcting value ($X_V$) is reset to be 0 at step S305.

In the illustrated embodiment, the order of taking three pictures at the AEB mode is selected ① (appropriate exposure →under exposure→over exposure). Another order can be selected to ② (under exposure→appropriate exposure→over exposure) or ③ (over exposure →appropriate exposure→under exposure) by changing the corresponding bits in the $E^2$-PROM. It should be appreciated that it is possible to provide a switching means to change the bits on a camera. In case that only one picture can be taken by using an incorporated flash at the AEB mode, the order of the exposure should be changed to select the appropriate exposure even when the above mentioned ② or ③ is selected.

As can be seen from the above discussion, according to the present invention, the exposure correcting values which are stored in the memory can be modified by the second switch which successively selected the drive mode, and accordingly, the number of the switches necessary for the camera can be reduced. In addition, the exposure correcting values stored in the memory can be used as an exposure width for the discontinuous (stepwise) exposure, resulting in less components of a camera.

TABLE 1

| (AEB) | | | | |
|---|---|---|---|---|
| AEB | | | AEB | |
| +$E_V$ | ±0 | −$E_V$ | $X_{VT}$ | |
| +4 | 0 | −4 | 0 | 0000 |
| +3.5 | 0 | −3.5 | 0 | 0001 |
| +3 | 0 | −3 | 0 | 0010 |
| +2.5 | 0 | −2.5 | 0 | 0011 |
| +2 | 0 | −2 | 0 | 0100 |
| +1.5 | 0 | −1.5 | 0 | 0101 |
| +1 | 0 | −1 | 0 | 0110 |
| +0.5 | 0 | −0.5 | 0 | 0111 |
| +0.3 | 0 | −0.3 | 0 | 1000 |

TABLE 2

| ($X_V$) | | | |
|---|---|---|---|
| $X_V$ | $X_{VT}$ | | $X_{VD}$ |
| 4 | 0 | 0000 | 0 |
| 3.5 | 0 | 0001 | 04/8 |
| 3 | 0 | 0010 | 10/8 |
| 2.5 | 0 | 0011 | 14/8 |
| 2 | 0 | 0100 | 20/8 |
| 1.5 | 0 | 0101 | 24/8 |
| 1 | 0 | 0110 | 30/8 |
| 0.5 | 0 | 0111 | 34/8 |
| 0 | 0 | 1000 | 40/8 |
| −0.5 | 0 | 1001 | 44/8 |
| −1 | 0 | 1010 | 50/8 |
| −1.5 | 0 | 1011 | 54/8 |
| −2 | 0 | 1100 | 60/8 |
| −2.5 | 0 | 1101 | 64/8 |
| −3 | 0 | 1110 | 70/8 |
| −3.5 | 0 | 1111 | 74/8 |
| −4 | 1 | 0000 | 80/8 |

We claim:

1. An exposure control apparatus of a camera comprising:
    a photometer for measuring brightness of an object to be photographed;
    photographing mode setting means for setting a desired photographing mode;
    drive mode selecting means for selecting a drive mode of a plurality of drive modes;
    exposure factor setting means for setting an exposure factor;
    film sensitivity setting means for setting sensitivity of a film;
    photometer switch means for actuating said photometer;
    release switch means for starting a releasing operation of a photographing operation;
    exposure operating means for arithmetically calculating exposure to obtain exposure control factors, based on the brightness detected by said photometer, the film sensitivity set by said film sensitivity setting means, the exposure factor set by said exposure factor setting means and the drive mode selected by said drive mode selecting means;
    photographing control means for performing photographing operations in accordance with the mode set by said photographing mode setting means and the exposure control factors obtained by said exposure operating means;
    wherein said drive modes include an auto-exposure bracket mode (AEB mode) which can be selected by said drive mode selecting means, and said photographing control means comprising means for associating a time interval between successive photographing operations in the AEB mode with release operations of said release switch means, wherein said photographing control means stops the photographing when the release switch means is turned OFF during photographing in the AEB mode, photographing being commenced by the releasing operation of said release switch means, after the photographing is stopped at the time when said release switch means is turned OFF, so that when the release operation is commenced again by said release switch means, the photographing in the AEB mode is continued.

2. An exposure control apparatus according to claim 1, wherein, when said release switch means is turned OFF during photographing in the AEB mode, photographing being commenced by the releasing operation of said release switch means, said photographing control means interrupts the remaining photographing at the AEB mode after the photographing is stopped when said release switch means is turned OFF, and wherein, when said photometer switch means is turned OFF, said photographing control means interrupts photographing at the AEB mode upon the lapse of a predetermined period of time after the stop of the operation of said photometer switch means.

3. An exposure control apparatus of a camera according to claim 1, further comprising indicating means for indicating that the AEB mode is selected or a picture is being taken at the AEB mode.

4. An exposure control apparatus of a camera according to claim 3, wherein said indicating means is discontinuously turned ON and OFF during photographing in the AEB mode.

5. An exposure control apparatus of a camera according to claim 1, further comprising indicating means which is provided in a finder of the camera, so that the indicating means is turned ON and OFF when the AEB mode is selected and when the photographing is effected in the AEB mode, respectively.

6. The exposure control apparatus according to claim 1, wherein, at said AEB mode, a plurality of photographing operations are performed on a single film.

7. A control apparatus for a camera operable in accordance with an auto-exposure bracket mode, wherein a sequence of photographing operations are performed at predetermined exposure values, the exposure value of photographing operations differing by a predetermined value, the exposure values being calculated in accordance with brightness of an object and with film sensitivity, the control apparatus comprising:

release switch means for starting a photographing operation of said camera when turned ON;

means for associating a time interval between successive ones of a sequence of photographing operations in the auto-exposure bracket mode with corresponding operations of said release switch means; and photographing control means for performing photographing operations in the auto-exposure bracket mode in accordance with the predetermined exposure values, said photographing control means being operative to stop the sequence of photographing operations when the release switch means is turned OFF during a sequence of photographing operations in the auto-exposure bracket mode, said photographing control means being operative to continue the sequence of photographing operations in the auto-exposure bracket mode upon actuation of said release switch means after said release switch means has been turned OFF to continue the photographing sequence in the auto-exposure bracket mode.

8. The control apparatus according to claim 7, said camera further comprising a photometer switch, when said photometer switch is turned OFF, said photographing control means being operative to interrupt a sequence of photographing operations in the auto-exposure bracket mode upon the lapse of a predetermined period of time after the turning OFF of said photometer switch.

9. The control apparatus of claim 7, said associating means comprising means for varying a time interval between a sequence of photographing operations in said auto-exposure bracket mode.

10. The control apparatus according to claim 7, wherein said sequence of photographing operations are preformed on a single film.

* * * * *